United States Patent
Knee et al.

(10) Patent No.: US 6,922,783 B2
(45) Date of Patent: Jul. 26, 2005

(54) METHOD AND APPARATUS FOR CONSERVING POWER ON A MULTIPROCESSOR INTEGRATED CIRCUIT

(75) Inventors: Derek Knee, Fort Collins, CO (US); Samuel Naffziger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 632 days.

(21) Appl. No.: 10/050,735

(22) Filed: Jan. 16, 2002

(65) Prior Publication Data

US 2003/0135768 A1 Jul. 17, 2003

(51) Int. Cl.[7] ............................................. H04L 9/32
(52) U.S. Cl. ....................................................... 713/200
(58) Field of Search ........................................ 713/200

(56) References Cited

U.S. PATENT DOCUMENTS

| | | | | |
|---|---|---|---|---|
| 5,890,217 A | * | 3/1999 | Kabemoto et al. | 711/141 |
| 6,035,358 A | * | 3/2000 | Tanikawa | 710/310 |
| 6,108,764 A | * | 8/2000 | Baumgartner et al. | 712/28 |
| 6,141,762 A | * | 10/2000 | Nicol et al. | 713/300 |
| 6,598,108 B1 | * | 7/2003 | Ashida et al. | 710/305 |
| 6,711,691 B1 | * | 3/2004 | Howard et al. | 713/300 |

* cited by examiner

*Primary Examiner*—John R. Cottingham

(57) ABSTRACT

A multiple processor integrated circuit has a first processor-first level cache combination powered by a first power terminal, and a second processor-first level cache combination powered by a second power terminal. There is common circuitry coupled to each processor-cache combination. In a particular embodiment, the processor-cache combinations are capable of receiving independently controlled power over the power terminals.

2 Claims, 1 Drawing Sheet

METHOD AND APPARATUS FOR CONSERVING POWER ON A MULTIPROCESSOR INTEGRATED CIRCUIT

BACKGROUND OF THE INVENTION

Integrated circuits combining at least one high performance processor with on-chip cache memory have become common in the art. Integrated circuits combining more than one high performance processor with on-chip cache memory are also available.

Memory references from a processor that are found in a cache are known as cache "hits". Memory references that do not "hit" in cache are cache "misses".

Many high performance processor integrated circuits have two power domains, a first power domain operating at a relatively low, core, voltage; and a second power domain operating at a higher, I/O (Input/Output) voltage. This typically permits design of processor and cache circuitry with transistors of smaller dimensions, including oxide thickness, than those used in the I/O pad ring. Typical processors, including the Pentium-3 (trademark of Intel Corporation) processors, require that both the core and I/O power domains receive power for correct operation.

Standard real time clock circuits also typically have two power domains. A first power domain operates I/O pad ring and most other logic of the circuit. A second power domain provides power to the clock circuitry, and often to memory circuitry, on the same integrated circuit. These circuits are typically powered on both I/O and clock power domains during normal operation of a system, and powered by a battery on the clock power domain when the system is in a low-power state. It has been found that interface logic between the power domains must be carefully designed to prevent excessive load on the attached battery, and to prevent corruption of clock domain memory and logic during power transitions of the I/O power domain.

It is well known in the art of integrated circuits that manufacturing processes are imperfect—on each wafer some, but not all, integrated circuits function fully. It is also known that defects tend to occur in clusters. Therefore, for circuits having multiple, large, functional units, such as processors, there will be a substantial population of manufactured integrated circuits where one functional unit is defective, or even a small portion of a function unit is defective, but other functional units on the same integrated circuit function properly.

The probability that an integrated circuit will have one or more defects increases as the size of the integrated circuit increases. Further, the cost of fabrication increases as integrated circuit size increases. A high performance single or multiple-processor integrated circuit can be quite large. It is therefore desirable to find ways of selling at least some of those large, multiple processor, integrated circuits that contain one or a few defects.

High performance processor integrated circuits are known to consume copious amounts of power, power requirements may exceed one hundred twenty-five watts. Multiple processor integrated circuits can have even higher power requirements, potentially as much as one hundred and fifty watts.

High power consumption can result in undesirably short battery life in portable systems. High power consumption is environmentally undesirable, requires that cooling apparatus be provided, and can result in critical circuitry overheating.

In addition, high power processors require a larger and more expensive infrastructure in terms of power delivery and heat removal. This infrastructure decreases the density of processors that can be attained within a given volume. This density of computation is an increasingly important metric.

It is known that load requirements on computer systems vary with time. Computer system performance can be degraded to conserve power during times of low load, and returned to full performance during times of high load.

Processor power typically has two components, static power that is constant with operating frequency, and dynamic power that is a function of operating frequency. Many notebook computers are equipped with adjustable clock circuits whereby processor operating frequency may be reduced, thereby reducing power consumption, during times of low load.

It is desirable to have additional ways of adjusting power consumption and performance to system load.

SUMMARY OF THE INVENTION

A multiple processor integrated circuit has three separate power supply connections. A first power connection provides power to the first processor and cache of the circuit, which form a first power domain. The integrated circuit has a second power connection providing power to the second processor and cache of the circuit, and forming a second power domain. The third power connection provides power to common logic of the integrated circuit, forming a third power domain. There may be additional power connections to the integrated circuit, forming additional power domains. Each power connection may have multiple pins.

In particular embodiments, the integrated circuit has interface circuitry between the first and third, and the second and third, power domains. This interface circuitry controls signals crossing domain boundaries to prevent improper operation of the circuit as power connections change voltage.

In an alternative embodiment, the third power connection is common with one, but not both, of the first and second power connections.

A system embodying the multiple processor integrated circuit has three independent power supply subsystems, each connected to one of the three power connections of the multiple processor integrated circuit. Each power supply subsystem is independently controllable by Input/Output (I/O) circuitry of the system. The system is capable of adjusting system power consumption and performance to system load by independently controlling the power supply subsystems. The system is capable of shutting off power to the first processor, while providing power to, and operating, the second processor.

DETAILED DESCRIPTION OF THE EMBODIMENTS

Figure 1:
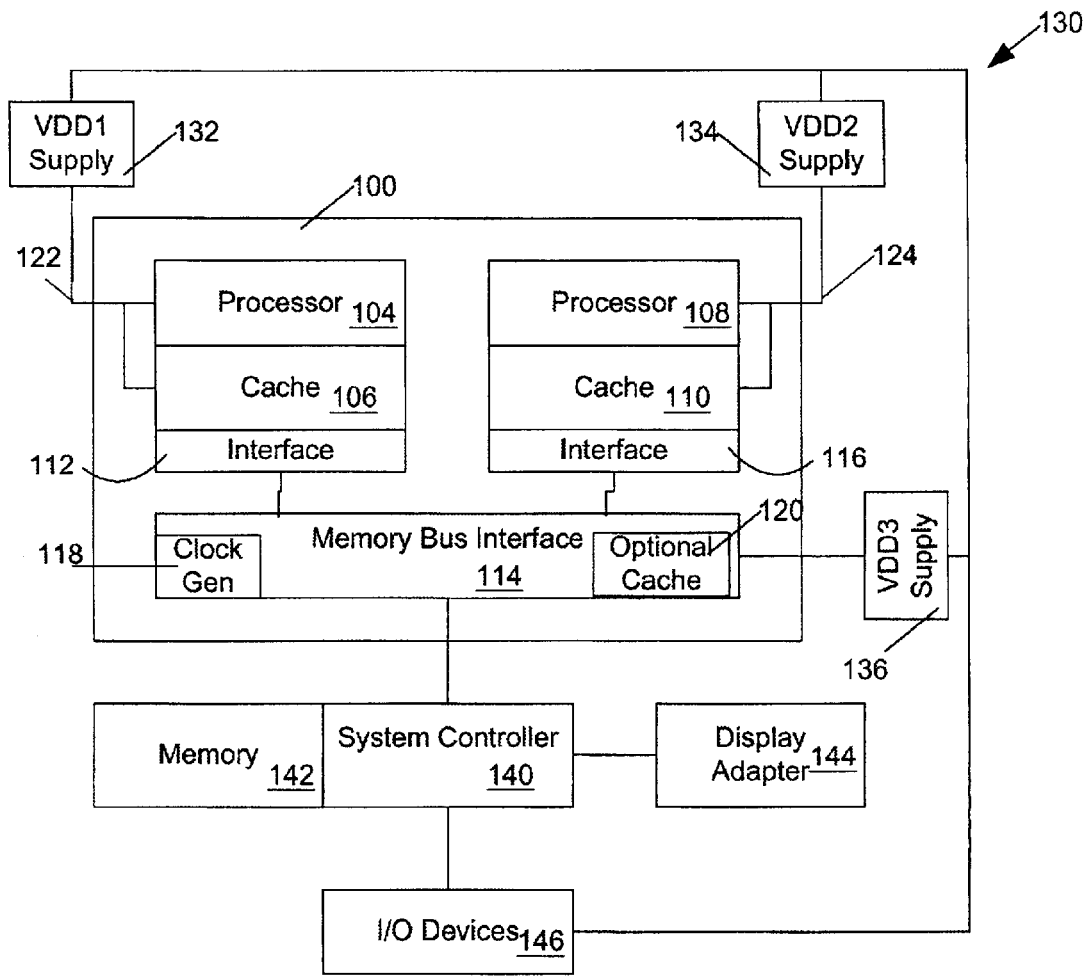
FIG. 1 is a block diagram of a system embodying a multiple-processor integrated circuit according to the invention.

An multiple processor integrated circuit 100 (FIG. 1) has a first processor 104 with cache 106, a second processor 108 and cache 110. Cache misses from cache 106 and I/O references from first processor 104 are passed through an interface 112 to common circuit elements, which includes a memory bus interface 114. Cache misses from cache 110 and I/O references from second processor 108 are passed through an interface 116 to common circuit elements including the memory bus interface 114.

In a particular embodiment, the common circuit elements include clock circuits 118 and an additional level of cache 120. The multiple processor integrated circuit 100 has three separate power supply connections. A first power connection 122 provides power to the first processor 104 and cache 106 of the circuit, which together form a first power domain. The integrated circuit 100 has a second power connection 124 providing power to the second processor 108 and cache 110 of the circuit, and forming a second power domain. Each cache 106 and 110 may be a single level cache, or in a particular embodiment, each cache 106 and 110 is a multi-level cache system of at least two levels. The third power connection 126 provides power to common logic, including the memory bus interface, optional additional cache 120, and clock circuits 118 of the integrated circuit 100, forming a third power domain. Each power connection may have multiple pins, in particular it is anticipated that the third power domain, having the common circuitry, may have many pins to permit control of switching transients that may occur as circuit pins change In an alternative embodiment, (not shown) there are four processors, each having its own first level cache, each having independent power connections forming four power domains. In this embodiment, the common logic circuitry has two power connections, one at a low, core, voltage and another at a higher, I/O interface, voltage, forming another two power domains. It is anticipated that other embodiments may have additional power connections to the integrated circuit, forming additional power domains.

In particular embodiments, the integrated circuit has interface circuitry between the first and third, and the second and third, power domains. This interface circuitry controls signals crossing domain boundaries to prevent improper operation, or destruction, of the circuit as power connections change voltage. In particular, for multiple processor integrated circuits fabricated in P-well or twin-well CMOS processes, this interface circuitry is designed according to the following rules:

1. To prevent forward-biasing of junctions, signals driven by gates powered by the third power domain are never connected to any P-diffusion located in a well that is electrically connected to either the first and second power domain;
2. To prevent corrupt operation, circuitry in the third power domain is designed to ignore all transitions in the first power domain when power provided to the first power domain is less than that required for normal operation;
3. To prevent corrupt operation, circuitry in the third power domain is designed to ignore all transitions in the second power domain when power provided to the first power domain is less than that required for normal operation;

In an alternative embodiment, the third power connection is common with one, but not both, of the first and second power connections. In this embodiment, the processor powered by the common supply can not be turned off in operation, while the processor powered by the separate supply can be.

A system 130 embodying the multiple processor integrated circuit 100 has three independent power supply subsystems 132, 134, and 136, each connected to one of the three power connections of the multiple processor integrated circuit 100. Power supply 132 connects to the first power connection 122, power supply 134 connects to the second power connection 124, and third power supply 136 connects to the third power connection 126.

The memory bus interface 114 of the multiple processor integrated circuit 100 is configured to pass memory references from first processor 104 and second processor 108 that miss in cache 106, 110, and 120, through a system controller 140 to main memory 142. Similarly, I/O references are passed through system controller 140 to a display adapter 144 and I/O devices 146. The system controller 140 is additionally configured to permit access to main memory 142 by the display adapter 144 and I/O devices 146.

The system controller 140, memory 142, display adapter 144, and I/O devices 146, are provided with power from a source other than the first and second power supplies 132 and 134.

Processor power supply subsystems 132 and 134 are independently controllable by I/O devices 146 of the system. The system is capable of adjusting system power consumption and performance to system load by independently controlling power supply subsystems 132 and 134. The system is capable of shutting off power to the first processor, by turning off power supply 132, while providing power to, and operating, the second processor through power supply 134.

In an alternative embodiment of the system, for use when the first processor 104 or first cache 106 is known to be defective but second processor 108 and cache 110 is known functional; the first power supply subsystem is either permanently disabled or deleted from the system.

It is known that processor integrated circuits have maximum frequencies of operation that vary with power supply voltage. A plot of operating frequency versus voltage is known as a "schmoo plot". In particular, it is known that maximum operating frequency 300 (FIG. 2) of a processor typically increases as processor voltage is increased. It is also known that power consumption of a processor typically increases proportional to the square of the processor voltage, and that excessive processor voltage can cause destruction of a processor.

It is therefore possible to choose a first, high performance, operating point 302 of voltage and frequency for a processor, such as processor 104. High performance operating point 302 has a higher frequency and higher operating voltage than a low performance operating point 304. Operation at high performance operating point 302 will cause processor 104 to dissipate more power than operation at the low performance operating point 304.

In a particular embodiment, power supplies 132 and 134 are adjustable under control of I/O devices 146.

Figure 2:
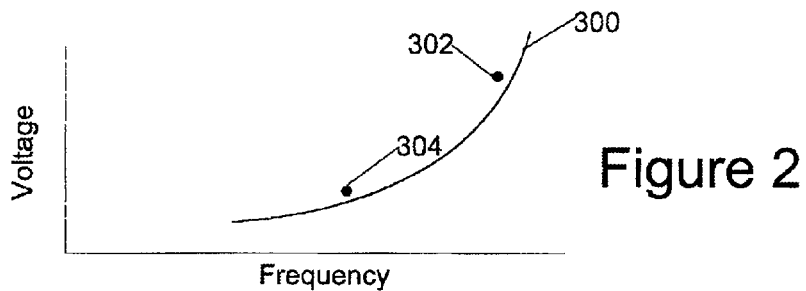
FIG. 2, a portion of a schmoo plot of a typical processor.

With reference to FIGS. 1 and 2, When it is desired to operate the system 130 at maximum performance, both the first 104 and second 108 processors are operated at the high performance operating point 302 by adjusting the clock circuit 118 and power supplies 132 and 134 appropriately. When it is desired to conserve power by degrading performance to a first level of degradation, power supply 132 is turned off and the first processor 104 and cache 106 are disabled. The system continues to operate using the second processor 108 and cache 110. When it is desired to conserve additional power by degrading performance further, the clock circuit 118 is set to the frequency of the low performance operating point 304, and after the frequency is set the power supply 134 attached to the second processor 108 and cache 110 is adjusted to the voltage of the low performance operating point.

While the invention has been particularly shown and described with reference to a preferred embodiment thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. A multiple processor integrated circuit comprises:

a first processor coupled to a first cache;

a first interface coupled to receive memory references that miss in the first cache;

a second processor coupled to a second cache;

a second interface coupled to receive memory references that miss in the second cache;

common circuitry coupled to the first interface and to the second interface;

a first power terminal coupled to provide power to the first processor;

a second power terminal coupled to provide power to the second processor;

a third power terminal coupled to provide power to the common circuitry;

wherein the common circuitry comprises a memory bus interface;

wherein the first interface is configured to permit operation of the second processor when the first power terminal is not powered;

wherein the second interface is configured to permit operation of the first processor when the second power terminal is not powered; and wherein the first interface is designed such that no signals driven by gates powered by the third power terminal are connected to any P-diffusion located in an N-well that is electrically connected to the first power terminal.

2. The processor integrated circuit of claim 1, wherein the first interface is designed such that no signals driven by gates powered by the third power terminal are connected to any P-diffusion located in an N-well that is electrically connected to the second power terminal.

* * * * *

UNITED STATES PATENT AND TRADEMARK OFFICE
CERTIFICATE OF CORRECTION

PATENT NO. : 6,922,783 B2
APPLICATION NO. : 10/050735
DATED : July 26, 2005
INVENTOR(S) : Derek Knee et al.

It is certified that error appears in the above-identified patent and that said Letters Patent is hereby corrected as shown below:

In column 5, line 11, in Claim 1, delete "comprises:" and insert -- comprising: --, therefor.

Signed and Sealed this

Fourth Day of August, 2009

JOHN DOLL
*Acting Director of the United States Patent and Trademark Office*